United States Patent [19]

Mori

[11] Patent Number: 4,703,076

[45] Date of Patent: Oct. 27, 1987

[54] COMPOSITION FOR SLIDING MEMBER

[75] Inventor: Sanae Mori, Nagoya, Japan

[73] Assignee: Daido Metal Company Ltd., Nagoya, Japan

[21] Appl. No.: 859,346

[22] Filed: May 5, 1986

[30] Foreign Application Priority Data

May 21, 1985 [JP] Japan .................................. 60-108576

[51] Int. Cl.$^4$ ...................... C08L 83/00; C08L 67/02; C08K 3/22; C08K 3/30
[52] U.S. Cl. .................................... 524/420; 524/407; 524/408; 524/409; 524/413; 524/404; 524/424; 524/430; 524/431; 524/432; 524/433; 524/506; 524/514; 524/520; 525/101; 525/166; 525/179; 525/189; 525/190
[58] Field of Search ............... 524/520, 506, 514, 430, 524/420, 406; 525/190, 166, 189, 101, 179

[56] References Cited

U.S. PATENT DOCUMENTS 4,477,630 10/1984 Saito et al. ......................... 525/190
4,548,986 10/1985 Suzuki et al. ....................... 525/179
4,605,695 8/1986 Sakamaki et al. .................. 524/520

FOREIGN PATENT DOCUMENTS 0124085 11/1984 European Pat. Off. .
52-13530 2/1977 Japan .................................. 525/189
52-24253 2/1977 Japan .................................. 525/166
1303483 1/1973 United Kingdom .

Primary Examiner—Lewis T. Jacobs
Attorney, Agent, or Firm—Browdy and Neimark

[57] ABSTRACT

A composition for the sliding member consisting of: at least one resin of the amount 0.1 to 50 volume % selected from group (A) consisting of tetrafluoroethylene-perfluoroalkylvinyl ether copolymer resin, tetrafluoroethylene-hexafluoropropylene copolymer resin and fluoroethylene propylene ether resin; at least one resin of the amount 0.1 to 50 volume % selected from group (B) consisting of oxybenzoylpolyester resin, phenylene sulfide polymers resin and thermosetting resins; and the balance substantially tetrafluoroethylene resin, the total amount of the constituents other than the tetrafluoroethylene resin being 0.3 to 70 volume %.

7 Claims, No Drawings

COMPOSITION FOR SLIDING MEMBER

BACKGROUND OF THE INVENTION

This invention relates to a composition for a sliding member having low friction properties and good wear resisting properties, and more specifically to a particular composition comprising fluorocarbon resin for use in forming, laminating, impregnating and coating sliding members or seal materials in part or in its entirety.

Hitherto, several synthetic resin compositions used for sliding members such as bearings or the like had been known, as well as sliding members made of such compositions. These are shown, for example, in (1) Japanese patent Examined Publication No. 31097/72, (2) Japanese patent Examined Publication No. 34698/77, (3) Japanese patent Unexamined Publication No. 166526/80, and (4) Japanese patent Unexamined Publication No. 103022/84.

First, the Publication (1) No. 31097/1972 discloses a composition having good lubricating property and wear resisting property and usable for bearings, the composition consisting of polytetrafluoroethylene formed as a continuous layer into which polyimide material is dispersed. Reference (2) Japanese Patent No. 34698/1972 discloses an oilless bearing containing polyfluoric addition polymer consisting of oxybenzoylpolyester and at least one unsaturated halogenated monomer selected from the group consisting of tetrafluoroethylene, perfluoropropylene, chlorotrifluoroethylene and vinylidene fluoride, at least 80 mol % of the hologen unit in the polymer being fluorine, the addition polymer being thermally stable at a temperature no less than 204° C. (400° F.), the polymer further containing oxybenzoylpolyester with the weight ratio of the former to the latter being 1:100 to 100:1.

Moreover, the reference (3) Japanese patent Unexamined Publication No. 166526/1980 discloses a sliding member and a manufacturing method thereof wherein the sliding surface of the member is coated with a 5-50 micron meter thick film of a synthetic resin consisting, by weight percent, of 90 to 97 wt% tetrafluoroethylene resin and 3 to 10 wt% polyphenylene sulfide resin. The reference (4) Japanese patent Laid-Open Publication No. 103022/1984 discloses a bearing material with good wear resisting property, wherein the material comprises a backing metal and a porous metal layer provided thereon on which layer is impregnated and coated any one of the following compositions: (A) a composition consisting of: a resin of the amount 0.1 to 50 volume % selected from the group consisting of tetrafluoroethylene-ethylene copolymer resin (ETFE), vinylidene fluoride resin (PVDF), chlorotrifluoroethylene resin (PCTFE) and fluoroethylene propylene ether resin (EPE); and the balance substantially tetrafluoroethylene resin (PTFE), (B) a composition consisting of: at least one resin of the amount 0.1 to 50 volume % selected from the group consisting of tetrafluoroethylenehexafluoropropylene copolymer resin (FEP), tetrafluoro ethyleneperchloroalkylvinyl ether copolymer resin (PFA), ETFE, PVDF, PCTFE and EPE, and the balance substantially PTFE, and (c) a composition consisting of: at least one resin of the amount 0.1 to 50 volume % selected from the group consisting of FEP, PFA, ETFE, PVDF, PCTFE and EPE; at least one material of the amount 0.1 to 35 volume % selected from the group consisting of a lubricant of a metal with a low melting point such as lead, tin or their alloys, a solid lubricant such as metal oxide, metal sulfide, metal fluoride or graphite, a fibrous material such as carbon fiber, and a ceramic material such as silicon carbide; and the balance substantially of PTFE, the total amount of the constituents other than PTFE being 0.2 to 70 volume %.

Since these fluorine-based resin compositions or the sliding members comprising the compositions are excellent in their lubricating performance and their wear resisting properties, they have been widely used in the field in comparison with sliding members which comprise other resins.

As mentioned above, the materials disclosed in the references (1) through (4) are useful as the compositions for the sliding members. However, in view of the various properties which have been demanded for materials used in recent times, these compositions or the sliding members were not necessarily satisfactory, particularly in regard to the low friction property and the wear resisting property both of which are deemed to be very important to maintain a good sliding performance.

SUMMARY OF THE INVENTION

The object of the invention is to improve the aforementioned shortcoming found in conventional sliding members or conventional compositions for the sliding members, and to provide such compositions for the sliding member as having improved low friction properties and improved wear resisting properties.

The first composition for the sliding member according to this invention is characterized in that the composition consists of: at least one resin of the amount 0.1 to 50 volume % selected from group (A) consisting of tetrafluoroethyleneperfluoroalkylvinyl ether copolymer resin (called as "PFA" hereinafter), tetrafluoroethylenehexafluoropropylene copolymer resin (called as "FEP" hereinafter) and fluoroethylene propylene ether resin (called as "EPE" hereinafter); at least one resin of the amount 0.1 to 50 volume % selected from group (B) consisting of oxybenzoylpolyester, phenylene sulfide polymers and thermosetting resins; and the balance substantially tetrafluoroethylene resin (called as "PTFE" hereinafter), the total of the constituents other than the PTFE being 0.3 to 70 volume %.

The second composition for the sliding member according to this invention is characterized in that the composition consists of: at least one resin of the amount 0.1 to 50 volume % selected from the group (A) consisting of PFA, FEP and EPE; at least one resin of the amount 0.1 to 50 volume % selected from the group (B) consisting of oxybenzoylpolyester, phenylene sulfide polymers and thermosetting resins; at least one material of the amount 0.1 to 50 volume % selected from the group (C) consisting of metal lubricants, metal oxides, composite metal oxides, metal sulfides, metal fluorides, carbonbased solid lubricant, fibrous materials and ceramics materials; and the balance substantially PTFE, the total content of the constituents other than PTFE being 0.3 to 70 volume %.

In either one of the first and second compositions for sliding members, any combination of at least one resin selected from the group (A) consisting of PFA, FEP and EPE with the PTFE, i.e., the combinations PTFE-PFA, PTFE-EPE, PTFE-FEP, PTFE-PFA-EPE, PTFE-PFA-FEP and PTFE-PFA-EPE-FEP can be used as fluorine-containing resin. These combined materials are mutually soluted each other during the sintering step thereof and result in a simple material which has a property quite different from those of original PFA, FEP, EPE or PTFE or the mere mixtures thereof. This can be understood by the fact that, before sintering, each of PTFE, PFA, FEP and EPE shows its peculiar melting point, while, after sintering, the aforementioned compositions shows its respective one single melting point. When this simple material or composition is analyzed by an optical microscope and a differential scanning calorimeter, the aforementioned composition shows a mutually soluted structure with no boundary for the constituents of the combined composition. In other words, the composition according to the present invention is not a mere polymer blend.

It is noted here that the constituents of the group (A) are limited to PFA, FEP and EPE, because, if other fluorine resins, e.g., those of ETFE, PVDF and PCTFE or the like are included to form the sliding member (this product is called as simple body or simple body sliding member hereinafter), the product will sometimes cause remarkable deformation such as decomposition, cracking and blaster, etc. or remarkable lowering of its mechanical strength during the sintering step in the manufacturing process of the product. However, when the product is made such that the compositions of the group (A) (PFA, FEP and EPE) are impregnated and coated onto a prefabricated base body of the sliding member so as to obtain an integral sliding member (in this case, the product is called as a composite body or composite body sliding member), the aforementioned other fluorine resins (ETFE, PVDF and PCTFE, etc.) can be used with the group (A) constituents.

The amount of usage of the constituents of group (A) is limited, by volume percent, to 0.1 to 50 volume % of the whole composition, because the value less than 0.1 can not achieve the present objectives, i.e., the improved friction property and the improved wear resisting property. On the other hand, a value larger than 50 volume % raises the frictional coefficient and frictional temperature to thereby deteriorate the sliding properties, although the wear resisting property can be improved.

It is thus noted here that the most preferable volume range of the group (A) constituents is from 2 to 30 volume %.

Referring next to the constituents of the group (B), either any one of the constituents of oxybenzoylpolyester, phenylene sulfide polymers and thermosetting resins or any combination of two or more of the constituents can be chosen and used to the extent of 0.1 to 50 volume % or preferably 2 to 30 volume % of the whole composition. If the constituent of the group (B) is used less than 0.1 volume %, it results in remarkable deterioration of both the low friction property and the wear resisting property, whereas the usage of group (B) constituent more than 50 volume % will result in a rise of both the frictional coefficient and the frictional temperature thereby to deteriorate the sliding properties and the bearing properties, although the wear resisting property can be improved.

By the thermosetting resins are meant at least one resin selected from the group consisting of polyimide resin, polyamidoimide resin and silicone resin, etc. which shows no remarkable deformation such as decomposition, cracking or blaster, etc. during the sintering step of the resin.

The group (C) constituents such as metal lubricant, solid lubricant, fibrous material or ceramics are also used in a limited range of 0.1 to 50 volume %, more preferably 2 to 30 volume %. The usage less than 0.1 volume % results in less improvement in regard to the wear resisting property, while the usage more than 50 volume % results in embrittlement of the product thereby rendering it impractical.

By the above-mentioned metal lubricant are meant Pb, Sn, Cu, Zn, Bi, Cd, In, Li and/or their alloys. The metal oxide means the respective oxides of the following elements Zn, Al, Sb, Y, In, Zr, Mo, Cd, Ca, Ag, Cr, Co, Ti, Si, Mn, Sn, Ce, W, Bi, Ta, Fe, Cu, Pb, Ni, Te, Nb, Pt, V, Pd, Mg and Li. The composite metal oxide means: $CoO\text{-}Al_2O_3$, $TiO_2\text{-}ZnO_2$, $PbO\text{-}TiO_2$, $CoO\text{-}SnO_2$, $MgO\text{-}Al_2O_3$, $ZrO_2\text{-}SiO_2$, $CoO\text{-}Al_2O_3\text{-}MgO$, $CoO\text{-}Al_2O_3\text{-}Cr_2O_3$, $CoO\text{-}ZnO\text{-}MgO$, $Pb_3O_4\text{-}Sb_2O_3\text{-}TiO_2$, $Cr_2O_3\text{-}Sb_2O_3\text{-}TiO_2$, $Cr_2O_3\text{-}CuO\text{-}MnO_2$, $CoO\text{-}Cr_2O_3\text{-}Fe_2)O_3$, $CoO\text{-}ZnO_2\text{-}NiO_2\text{-}TiO_2$, and $CoO\text{-}Cr_2O_3\text{-}MnO_2 Fe_2O_3$, etc. The metal fluoride means $PbF_2$, $AlF_3$, $CdF_2$ and $BaF_2$, etc.; the carbon base solid lubricant means graphite fluoride, graphite, coke and carbon, etc. The fibrous material means carbon fiber, glass fiber, cotton (cellulose), asbestos, rock wool, potassium titanate fiber, natural and synthetic fibers of aromatic polyamide, etc.; the ceramics mean SiC, TiC, TiN, $B_4C$, BN, $Si_3N_4$, AlN, HfN, TaN, WC, TaC, VC and ZrC, etc.

Although the above-mentioned constituents are used within the aforementioned limits, it is further required that the total of each constituent other than PTFE be limited to 0.3 to 70 volume %, preferably 5 to 50 volume %. This is because, if the total of the constituents is less than 0.3 volume %, there is no effect in regard to the addition of the constituents, whereas if the total amount is more than 70 volume % the product is embrittled, rendering it impractical, and there is no multiplication effect by each constituent resulting in the rise of both the friction coefficient and the frictional temperature thus causing a poor sliding property.

There are two methods to produce the compositions from these constituents; one being a dry method and the other being the wet method. The dry method comprises simply mixing the constituents. The wet method comprises making a dispersion of PTFE [an aqueous dispersion consisting of 30 wt. % PTFE and the balance 70 wt % water] and adding and mixing the constituents other than PTFE and, if necessary, a surface active agent, an organic solvent such as toluene, etc. and a coagulating agent such as aluminum nitrate in order to produce a paste like mixture. It is noted here that while the composition according to the present invention can be used for manufacturing both a simple body and a composite body, the latter can be manufactured not only by impregnating and coating the composition onto the backing plate but also by first forming a sheet made of the composition and then bonding the sheet together with the backing plate.

The backing plate used for the invention may be a metal other than steel. The plate can be without plating or with plating of metal or its alloys other than copper. The porous layer formed on the backing plate can be a metal or its alloys other than the copper base alloy such as bronze.

DESCRIPTION OF THE PREFERRED EMBODIMENTS

The conventional composition and the composition according to the invention will be compared hereinafter in regard to their manufacturing processes together with the results of their performance test.

EXAMPLE 1

(applied to the manufacturing of a simple body)

The simple body sliding members were manufactured according to the following steps:

(a) Metering step—Powders having the compositions shown in Table 1 were metered;

(b) Mixing step—The powders were mixed for 2 to 10 minutes using a mixer (e.g. Henshel mixer);

(c) Compacting step—A compressive pressure of 1000 kg/cm$^2$ was utilized to make a solid cylindrical compact having dia. of 50 mm and height of 50 mm or a hollow cylindrical compact having external dia. of 35 mm, internal dia. of 15 mm and height of 40 mm; and (d) Sintering step—The compacts were put into a furnace under an inert gas (for example N$_2$ gas) atmosphere or an air atmosphere and gradually heated from ambient temperature up to 327° C. to 400° C. where they were held and sintered for a few hours and then cooled in the furnace.

The above-mentioned steps (a) to (d) yielded ten simple body sliding members, two of them (Nos. 1 and 2) being conventional members and the other eight (Nos 3 to 10) being members according to the invention.

The bearing properties of those sliding members are shown in Table 1 and the testing conditions for the members are shown in Table 2.

EXAMPLE 2

(applied to the manufacturing of composite body)

The composite body sliding members were manufactured according to the following steps:

(a) Plating copper layer of 5 μm in thickness on the surface of a usual structural carbon steel sheet having a thickness of 1.24 mm;

(b) Disposing on the copper-plated layer a copper alloy powder by a thickness of 0.35 mm, the powder consisting by weight of 10 to 12% Sn, 3 to 5% Pb, 0.2 to 0.4% P and the balance Cu and having a particle dimension range of -120 mesh to +120 mesh (125 μm to 74 μm in the particle size);

(c) Sintering the powder under an air atmosphere into a porous material at a temperature of 800° to 860° C. and a holding time of 5 to 10 minutes;

(d) Coating the surface of the porous layer with the composition shown in Table 1 by a thickness of 1–2 mm, and making the coated sheet pass through a pair of rolls to provide the rolled thickness of the coated composition in the range of 0.01 to 0.03 mm, so that the composition is impregnated into the pores of the porous layer and is coated onto the surface of the porous layer. The coated and impregnated sheet was sintered at a temperature of 327° to 400° C. for 2 to 5 minutes, and then passed again through the rolls to obtain a uniform total thickness of 1.50 mm.

Thus, by steps (a) through (d) seven composite body sliding members were obtained; three of them (Nos. 11 to 13) being conventional members and the other four (Nos. 14 to 17) being members according to the invention.

The testing results for these members are shown in Table 1, and the testing conditions are shown in Table 2.

EXAMPLE 3

(a case of manufacturing the composite body)

Further composite body sliding members were manufactured according to the following steps: (a) Producing 0.5 mm thick sheets, from the solid cylindrical compact having dia. of 50 mm and height of 50 mm made in Example 1, by means of slicing technique (for example the skiving method); (b) Roughening the surface of a 1.0 mm thick usual structural steel sheet after it is degreased, by means of shot blasting and linisher belt, etc.; and (c) Bonding the steel sheet and the compact sheet directly by means of epoxy base adhesive or by means of thermal-pressure bonding with the interface layer of PFA film or FEP film between both sheets.

TABLE 1

Compositions for Simple Body or for Coating and Impregnating

| | No. | Group A PFA | Group A EPE | Group A FEP | Group B Oxybenzoyl-polyester | Group B Poly-imide | Group B PPS | Group C Bronze powder | Group C Graphite | Group C MoS$_2$ | Group C Carbon fiber | Group C PbF$_2$ | Group C Al$_2$O$_3$ | Group C PbO—TiO$_2$ | PTFE | Wear μm | Friction coefficient | Remarks Publicly known Data No. |
|---|---|---|---|---|---|---|---|---|---|---|---|---|---|---|---|---|---|---|
| Conventional Materials | 1 | | | | 20 | | | | | | | | | | | | | |
| | 2 | | | | | 20 | | | | | | | | | | | | |
| Material of the Invention | 3 | | 10 | | 20 | | | | | | | | | | | | | |
| | 4 | | 10 | | | 20 | | | | | | | | | | | | |
| | 5 | | | 3 | 30 | 10 | | | | | | | | | | | | |
| | 6 | 30 | 10 | | 1 | | 1 | | | | | | | | | | | |
| | 7 | | 10 | | | 20 | | | 10 | | | | | | | | | |
| | 8 | 10 | 10 | | | 20 | | | | | | | | | | | | |
| | 9 | | 10 | | 1 | 1 | | 25 | 5 | 5 | | | | | | | | |
| | 10 | 1 | | 1 | 1 | 1 | | | | | 4 | | | | | | | |
| Conventional Materials | 11 | | | | | | 10 | | | | | | | | | | | |
| | 12 | 5 | | 5 | | | | | | | | | | | | | | |
| | 13 | | 10 | | | | 10 | | | | | | | | | | | |
| Material of the Invention | 14 | 5 | | 5 | 10 | | | | | | | | | | | | | |
| | 15 | | 10 | | 20 | | | | | | | | | | | | | |
| | 16 | | 10 | | | | 10 | | | 5 | | | | | | | | |

TABLE 1-continued

Compositions for Simple Body or for Coating and Impregnating

| Category | No. | | | | | | Ref | Type |
|---|---|---|---|---|---|---|---|---|
| Conventional Materials | 1 | | | Bal | 19.0 | 0.208 | (2)* | Simple body |
| | 2 | | | Bal | 23.0 | 0.190 | (1) | |
| Material of the Invention | 3 | | | Bal | 6.5 | 0.145 | | |
| | 4 | | | Bal | 10.0 | 0.158 | | |
| | 5 | | | Bal | 7.5 | 0.154 | | |
| | 6 | | | Bal | 10.0 | 0.163 | | |
| | 7 | | | Bal | 8.0 | 0.145 | | |
| | 8 | | 0.5 | Bal | 7.0 | 0.160 | | |
| | 9 | | | Bal | 7.0 | 0.150 | | |
| | 10 | | | 1 Bal | 9.5 | 0.145 | | |
| Conventional Materials | 11 | | | Bal | 7.0 | 0.225 | (3) | Composite body |
| | 12 | 10 | | Bal | 4.5 | 0.185 | (4) | |
| Material of the Invention | 13 | 10 | | Bal | 2.0 | 0.160 | | |
| | 14 | | | Bal | 1.0 | 0.159 | | |
| | 15 | | | Bal | 1.0 | 0.148 | | |
| | 16 | | | 1 Bal | 1.5 | 0.155 | | |

*Publicly known Data No. (obtained in the Prior Art described above)
(1) JP, B2 No. 31097/1972
(2) JP, B2 No. 34698/1977
(3) JP, A, No. 166526/1980
(4) JP, A, No. 103022/1984

TABLE 2

| Conditions for the friction and wear test | |
|---|---|
| Apparatus | Thrust type friction and wear tester |
| Size of test specimen | Ext. dia. 50 mm × Thickness 5 mm (for mono body) 50 mm × 50 mm × 1.5 mm (for composite body) |
| Load | 25 kg/cm$^2$ |
| Peripheral speed | 0.1 m/sec |
| Test period | 4 hrs |
| Lubrication | dry |

As understood from Table 1, the comparison between the conventional sliding members [sample Nos. 1 and 2 (mono body) and sample Nos. 11 to 12 (composite body)] and the members according to the invention [sample Nos. 3 to 10 (mono body) and sample Nos. 13 to 18 (composite body) reveals that the present invention achieved improvement over the conventional member in terms of the friction coefficient and the amount of wear.

Referring to the simple body, the comparison will first be made between the conventional member No. 1 and the invention No. 3; although the latter is formed only by adding the EPE constituent of the group (A) to the former, the material No. 3 shows 6.5 μm wear amount while the conventional member No. 1 shows 19.0 μm, that is, a reduction of the wear in the invention in comparison with the conventional member becomes $\frac{5}{8}$. In addition to the improvement of wear resisting property, the invention also showed an remarkable lower value of friction coefficient thereby improving the low friction property of the invention.

The comparison between the conventional member No. 2 and the material No. 4 reveals that the invention has been improved in great degree in regard to the aforementioned friction and wear properties. Further, comparison between the conventional member No. 1 and the material Nos. 5 to 10 also shows that the invention is similarly improved over the conventional member in regard to the friction and wear properties.

As regards the composite body, the comparison will be first made between the conventional member No. 11 and the material No. 13 of the invention. This indicates that the material No. 13 of the invention, although formed only by adding the EPE constituent of the group (A) to the conventional member No. 11, is excellent in its wear resisting property, that is, the reduction ratio of wear amount down to 1/3.5 is achieved by the former over the latter, and that the invention also showed low friction coefficient.

A further comparison of the conventional member No. 12 with the material No. 14 indicates that the latter, although formed only by adding the oxybenzoylpolyester constituent of the group (B) to the conventional member No. 12, showed improved wear resisting property since the wear amount of the latter is reduced to 1/4.5 of that of the conventional member and the friction coefficient of the latter is also lower than the former.

The compositions for the sliding member according to the invention may be used, as shown in Example 1, as a simple body sliding member (for comparatively low load application). If this composition is used, as shown in Example 2, as a composite body sliding member, the latter (Example 2) having a metal backing plate can achieve an improvement over the former (Example 1) is regard to the mechanical strength as well as the thermal conductivity of the member, thereby drastically improving various bearing properties such as load bearing capacity, antiseizure property and dimensional stability.

It should be noted here that the Example 3 has the bearing properties which are almost of the same degree as those of the Example 2.

Finally, the specific application examples of the sliding members manufactured using the compositions for the sliding member according to the invention will be described: in the case of the simple body sliding member, these are applicable to OA apparatus, piston ring for automative shock absorber, oil seal, and general industrial apparatus; and in the case of the composite body sliding member, these are applicable to bearings or seals used for a reciprocating mechanism such as found in the oil cylinder of an automotive shock absorber, the bearing for the pump, general industrial apparatus, and other various application fields such as oil lubrication bearings or oilless bearings.

As described, the present invention is very useful in the industry from the viewpoints of practice and economy.

What is claimed is:

1. A composition for a sliding member consisting of:
   at least one resin in the amount of 0.1 to 50 volume % selected from group (A) consisting of tetrafluoroethylene-perfluoroalkylvinyl ether copolymer resin, tetrafluoroethylene-hexafluoropropylene copolymer resin and fluoroethylene propylene ether resin;
   at least one resin in the amount of 0.1 to 50 volume % selected from group (B) consisting of axybenzoyl-polyester resin, phenylene sulfide resin, polyimide resin, polyamidoimide resin and silicone resin;
   and the balance substantially tetrafluoroethylene resin, the total amount of said constituents other than said tetrafluoroethylene being 0.3 to 70 volume %.

2. The composition for the sliding member of claim 1, wherein the amount of said at least one resin selected from the group (A) is 2 to 30 volume %.

3. The composition for the sliding member of claim 1, wherein the amount of said at least one resin selected from the group (B) is 2 to 30 volume %.

4. A composition for a sliding member consisting of:
   at least one resin in the amount of 0.1 to 50 volume % selected from group (A) consisting of tetrafluoroethylene-perfluoroalkylvinyl ether copolymer resin, tetrafluorroethylene-hexafluoropropylene copolymer resin and fluoroethylene propylene ether resin;
   at least one resin in the amount of 0.1 to 50 volume % selected from group (B) consisting of oxybenzoyl-polyester resin, phenylene sulfide resin, polyimide resin, polyamidoimide resin and silicone resin;
   at least one material in the amount of 0.1 to 50 volume % selected from group (C) consisting of metal lubricant, metal oxide, composite metal oxide, metal sulfide, metal fluoride, carbon base solid lubricant, fibrous material and ceramics; and the balance substantially tetrafluoroethylene, the total amount of said constituents other than said tetrafluoroethylene resin being 0.3 to 70 volume %.

5. The composition for the sliding member of claim 4, wherein the amount of said at least one resin selected from the group (A) is 2 to 30 volume %.

6. The composition for the sliding member of claim 4, wherein the amount of said at least one resin selected from the group (B) is 2 to 30 volume %.

7. The composition for the sliding member of claim 4, wherein the amount of said at least one resin selected from the group (C) is 2 to 30 volume %.

* * * * *